United States Patent
Lukins et al.

(10) Patent No.: US 8,230,473 B2
(45) Date of Patent: Jul. 24, 2012

(54) APPARATUS AND METHOD FOR REPRODUCING DIGITAL CONTENT USING NETWORK

(75) Inventors: Gregory J. Lukins, Sanford, FL (US); Wonjang Baek, Gyeonggi-do (KR)

(73) Assignee: SK Planet Co., Ltd., Seoul (KR)

( * ) Notice: Subject to any disclaimer, the term of this patent is extended or adjusted under 35 U.S.C. 154(b) by 765 days.

(21) Appl. No.: 12/216,826

(22) Filed: Jul. 11, 2008

(65) Prior Publication Data

US 2009/0019506 A1    Jan. 15, 2009

Related U.S. Application Data

(60) Provisional application No. 60/949,427, filed on Jul. 12, 2007, provisional application No. 60/970,425, filed on Sep. 6, 2007.

(51) Int. Cl.
*H04N 7/173* (2011.01)

(52) U.S. Cl. ........................ 725/109; 725/110

(58) Field of Classification Search .................. 725/109, 725/110

See application file for complete search history.

(56) References Cited

U.S. PATENT DOCUMENTS

| | | | |
|---|---|---|---|
| 6,311,161 B1* | 10/2001 | Anderson et al. | 704/500 |
| 7,457,532 B2* | 11/2008 | Barde et al. | 386/248 |
| 2005/0091688 A1* | 4/2005 | Chang et al. | 725/60 |
| 2005/0283737 A1* | 12/2005 | Ha | 715/776 |
| 2007/0094081 A1* | 4/2007 | Yruski et al. | 705/14 |

* cited by examiner

*Primary Examiner* — Pankaj Kumar
*Assistant Examiner* — Franklin Andramuno
(74) *Attorney, Agent, or Firm* — Stein McEwen, LLP (57) ABSTRACT

An apparatus and a method for reproducing a digital content using a network capable of accessing a remote digital programming via the network such as Internet are disclosed. In accordance with the apparatus and the method, a remote digital programming such as a video/audio stream and a menu data is downloaded via the network to provide a user with contents that is not included in a storage medium at a time of manufacturing thereof.

19 Claims, 9 Drawing Sheets

APPARATUS AND METHOD FOR REPRODUCING DIGITAL CONTENT USING NETWORK

This application claims the benefit of Provisional Application No. 60/949,427 filed on Jul. 12, 2007 and Provisional Application No. 60/970,425 filed on Sep. 6, 2007, which are hereby incorporated for reference.

BACKGROUND OF THE INVENTION

1. Field of the Invention

The present invention relates to an apparatus and a method for reproducing a digital content using a network, and more particularly to an apparatus and a method for reproducing a digital content using a network capable of accessing a remote digital programming via the network such as Internet.

2. Description of the Related Art

An apparatus for reproducing a digital content such as DVD players serve the purpose of playing pre-recorded audio and video on a viewing device like a television. However, a capability of the DVD player is generally limited to playing back the digital content pre-recorded onto a disc that is inserted into the DVD player. Consumers are limited to watching the titles the consumers have already purchased, what is in stock at a local video rental store, or waiting for a mail-order service to deliver new movies.

Recently, companies like Amazon and WalMart have introduced services which can deliver the content to a consumer's home via a connection to the Internet. These services offer the consumers an opportunity to purchase and view a video programming, but the consumers are restricted to watching the video programming on a personal computer. Companies like Apple and Microsoft are offering solutions for watching the downloaded video programming on the television. However such solutions require multiple pieces of expensive equipments (about $700 for a complete solution) which may be difficult to setup and operate.

SUMMARY OF THE INVENTION

It is an object of the present invention to provide an apparatus and a method for reproducing a digital content using a network capable of accessing a remote digital programming via the network such as Internet.

In accordance with a first aspect of the present invention, there is provided a digital content reproducing apparatus comprising: a storage for storing a local digital programming and a local digital content therein, the local digital programming including a list comprising a plurality of timecodes and a plurality of URLs of remote digital programmings, each of the plurality of URLs corresponding to each of the plurality of timecodes; a network interface for downloading the remote digital programmings according to the list stored in the storage; a decoder for decoding and outputting the local digital content stored in the storage to provide the local digital content to a user; and a controller for controlling the network interface to download at least one of the remote digital programmings from the plurality of URLs in the list according to the list, the controller executing the at least one of the remote digital programmings to be provided to the user when each of plurality of timecodes corresponding to each of the remote digital programmings is reached, wherein the at least one of the remote digital programmings downloaded by the network interface and the local digital content decoded by the decoder are provided to the user simultaneously.

In accordance with a second aspect of the present invention, there is provided a method for reproducing a digital content, the method comprising steps of: (a) executing a local digital programming including a list comprising a plurality of timecodes and a plurality of URLs of remote digital programmings, each of the plurality of URLs corresponding to each of the plurality of timecodes; (b) downloading at least one of the remote digital programmings from the plurality of URLs in the list; (c) decoding and outputting a local digital content to provide the local digital content to a user; and (d) executing each of the at least one of the remote digital programmings downloaded in the step (b) to be provided to the user when each of plurality of timecodes corresponding to each of the remote digital programmings is reached, wherein the at least one of the remote digital programmings downloaded in the step (b) and the local digital content decoded in the step (c) are provided to the user simultaneously.

DETAILED DESCRIPTION OF THE INVENTION

The present invention will now be described in detail with reference to the accompanied drawings. The interpretations of the terms and wordings used in Description and Claims should not be limited to common or literal meanings. The embodiments are provided for the skilled in the art to more completely understand the present invention.

Figure 1:
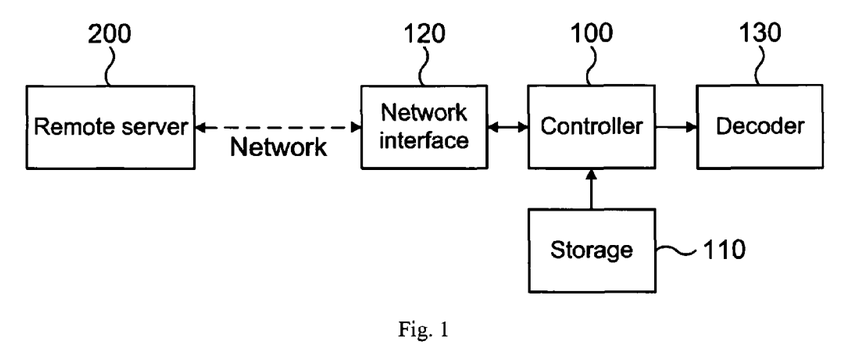
FIG. 1 is a diagram illustrating an apparatus for reproducing a digital content using a network in accordance with the present invention.

FIG. 1 is a diagram illustrating an apparatus for reproducing a digital content using a network in accordance with the present invention.

Referring to FIG. 1, the apparatus for reproducing the digital content using the network comprises a controller 100, a storage 110, a network interface 120, a decoder 130.

The apparatus may be embodied in a form of a DVD player, a Blu-ray player, a HD-DVD player or a set-top box. The digital content may be a digital video data such as an MPEG video stream, a digital audio data such as an MPEG audio stream, a digital video/audio data such as a multiplexed MPEG stream or a menu data to be displayed on a screen of a display device which may be stored locally in an optical disk or a non-volatile memory or be downloaded from a remote server 200.

The storage 110 stores a local digital content therein within the apparatus of the present invention. The local digital content refers to one of the digital video data, the digital audio data, the menu data and combinations thereof stored locally in the storage 110. The storage 110 may include an optical disk or a non-volatile memory for storing the local digital content.

The storage 110 also stores a local digital programming. The local digital programming includes a list of URLs (Universal Resource Locators) of a remote digital programming stored in the remote server 200. In addition to the list of the URLs, the local digital programming may further comprise a list of timecodes of the corresponding remote digital programming.

The storage 110 may further store an encryption key for the controller 100 to control the network interface to transmit the encryption key to the remote server 200 for an authentication prior to downloading the remote digital programming.

The remote digital programming refers to one of the digital video data, the digital audio data, the menu data and combinations thereof stored in the remote server. The URL may include a link for at least one of the digital video data, the digital audio data, the menu data, a UI objects, a program data and a workflow instruction required for an interactive application.

The network interface 120 downloads the remote digital programming according to the list stored in the storage 110.

The decoder 130 decodes and outputs the local digital content to provide the decoded local digital content to a user via a display device such as a television.

The controller 100 controls the network interface 120 to download the remote digital programming according to the list. Specifically, the controller 100 reads and loads the local digital programming into a memory by executing the local digital programming. The list of the URLs is obtained by the execution of the local digital programming.

When the remote digital programming is downloaded, the controller 100 executes the downloaded remote digital programming to provide the remote digital programming to the user. If the time code corresponding to the remote digital programming exists, the remote digital programming is executed according to the timecode.

In one embodiment, when the remote digital programming is a video/audio stream, the local digital content and the remote digital programming are provided to the user simultaneously.

In another embodiment, when the remote digital programming comprises a basic remote menu data including a basic remote menu information, the controller 100 displays the basic remote menu information on the screen such that the user may make a selection using a remote control. When the selection made by the user is another menu item or another digital content stored in the remote server 200, the controller 100 controls the network interface 120 to download an additional remote menu data corresponding the selected menu item or a remote digital content corresponding to the selected digital content.

When the selected menu data or the digital content is downloaded, the controller 100 displays the downloaded additional remote menu data on the screen or controls the decoder 130 to decode and output the downloaded remote digital content.

In another embodiment, the controller may control the network interface to periodically download a periodic remote digital programming in order to provide an updated version of the remote digital programming to the user.

Figure 2:
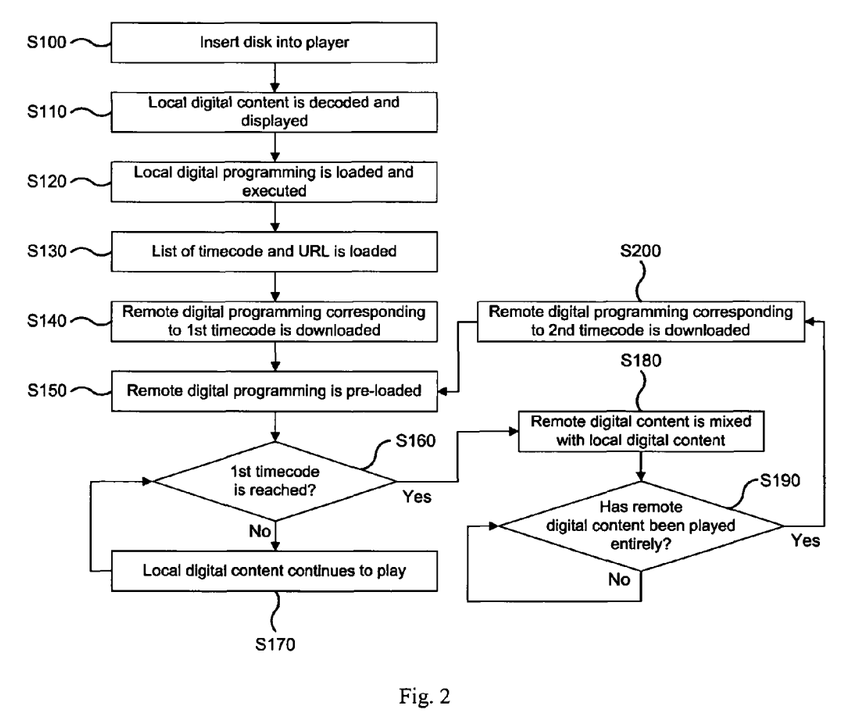
FIG. 2 is a flow diagram illustrating a method for reproducing a digital content using a network with a first embodiment of the present invention.

FIG. 2 is a flow diagram illustrating a method for reproducing a digital content using a network with a first embodiment of the present invention.

Specifically, FIG. 2 illustrates a method carried out in an apparatus for reproducing the digital content using the network such as a DVD player capable of establishing a network connection wherein an optical disk such as a DVD is used as the storage.

Referring to FIG. 2, when the optical disk is inserted in the DVD player (S100), a local digital content stored in the optical disk may be decoded and outputted to a display device to be provided to a user (S110). Simultaneously, a local digital programming stored in the optical disk is loaded in a memory and executed (S120).

A BD-J implementation may be employed to automatically look for the local digital programming such as a startup xlet each time the disk is inserted into the DVD player. The local digital programming includes a list of timecodes and URLs (universal resource locators) of remote digital programmings. The URL may include a link for at least one of a video/audio stream, a UI objects, a program data and a workflow instruction required for an interactive application. In accordance with the first embodiment, the remote digital programming may be a remote digital content such as the video/audio stream.

The list of the timecodes and the URLs of the remote digital programming are loaded into the memory (S130) when the local digital programming is executed.

Thereafter, the remote digital programming at a first URL corresponding to a first timecode in the list is downloaded and pre-loaded into a frame buffer via the network such as The Internet (S140 and S150).

The local digital content is continuously decoded and outputted to the display device (S170) until the first timecode is reached. When the first timecode is reached (S160), the remote digital programming is executed and provided to the user (S180) by combining the remote digital content which is the video/audio stream with the local digital content, i.e. by mixing an audio/video signal of the remote digital content with that of the local digital content to be displayed on the display device simultaneously.

When execution of the remote digital programming is finished, that is, when the remote digital content has been played entirely (S190), the remote digital programming at a second URL corresponding to a second timecode is downloaded (S200) and pre-loaded into the frame buffer (S150). When the second timecode is reached, the process is repeated.

Figure 3:
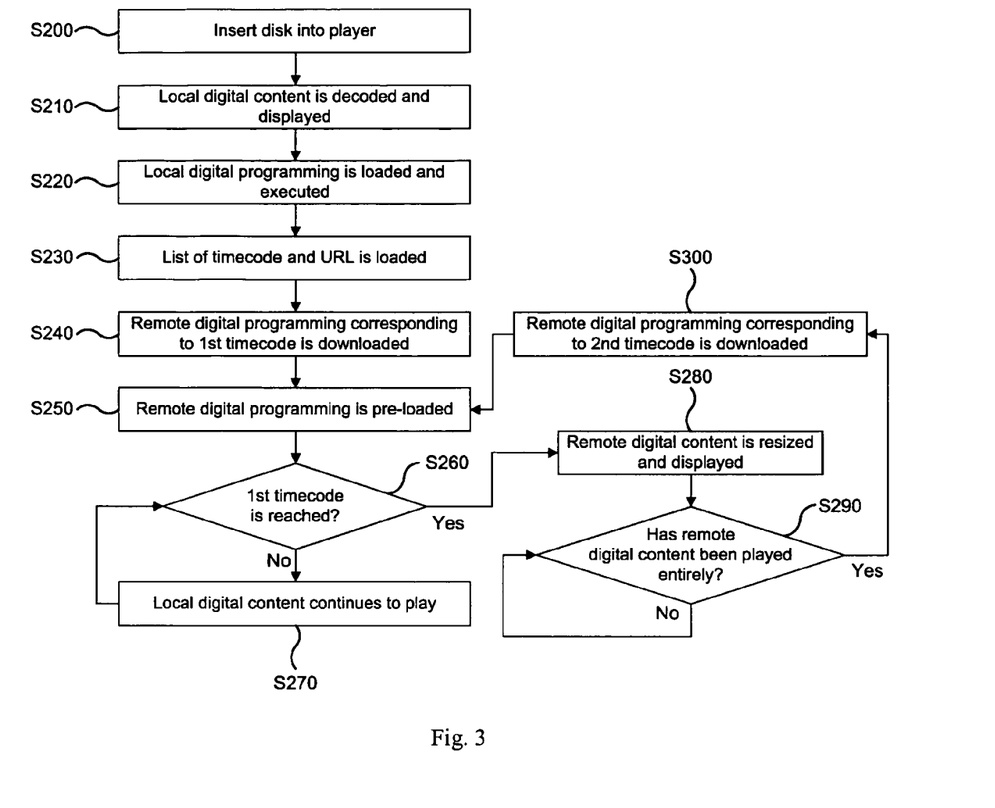
FIG. 3 is a flow diagram illustrating a method for reproducing a digital content using a network with a second embodiment of the present invention.

FIG. 3 is a flow diagram illustrating a method for reproducing a digital content using a network with a second embodiment of the present invention.

Similar to the method shown in FIG. 2, FIG. 3 illustrates a method carried out in an apparatus for reproducing the digital content using the network such as the DVD player capable of establishing the network connection wherein the optical disk such as the DVD is used as the storage.

Referring to FIG. 3, when the optical disk is inserted in the DVD player (S200), a local digital content stored in the optical disk may be decoded and outputted to a display device to be provided to a user (S210). Simultaneously, a local digital programming stored in the optical disk is loaded in a memory and executed (S220).

A BD-J implementation may be employed to automatically look for the local digital programming such as a startup xlet each time the disk is inserted into the DVD player. The local digital programming includes a list of timecodes and an URLs (universal resource locators) of a remote digital programming. The URL may include a link for at least one of a video/audio stream, a UI objects, a program data and a workflow instruction required for an interactive application. In accordance with the second embodiment, the remote digital programming may be a remote digital content such as the video/audio stream.

The list of the timecodes and the URLs of the remote digital programming is loaded into the memory (S230) when the local digital programming is executed.

Thereafter, the remote digital programming at a first URL corresponding to a first timecode in the list is downloaded and pre-loaded into a frame buffer via the network such as The Internet (S240 and S250).

The local digital content is continuously decoded and outputted to the display device (S270) until the first timecode is reached. When the first timecode is reached (S260), the remote digital programming is executed and provided to the user (S280) by resizing the remote digital content which is the video/audio stream to occupy a portion of the decoded local digital content. That is, the remote digital content is resized to occupy a portion of a screen of the display device that is displaying the local digital content.

When execution of the remote digital programming is finished, that is, when the remote digital content has been played entirely (S290), the remote digital programming at a second URL corresponding to a second timecode is downloaded (S300) and pre-loaded into the frame buffer (S250). When the second timecode is reached, the process repeats.

Figure 4:
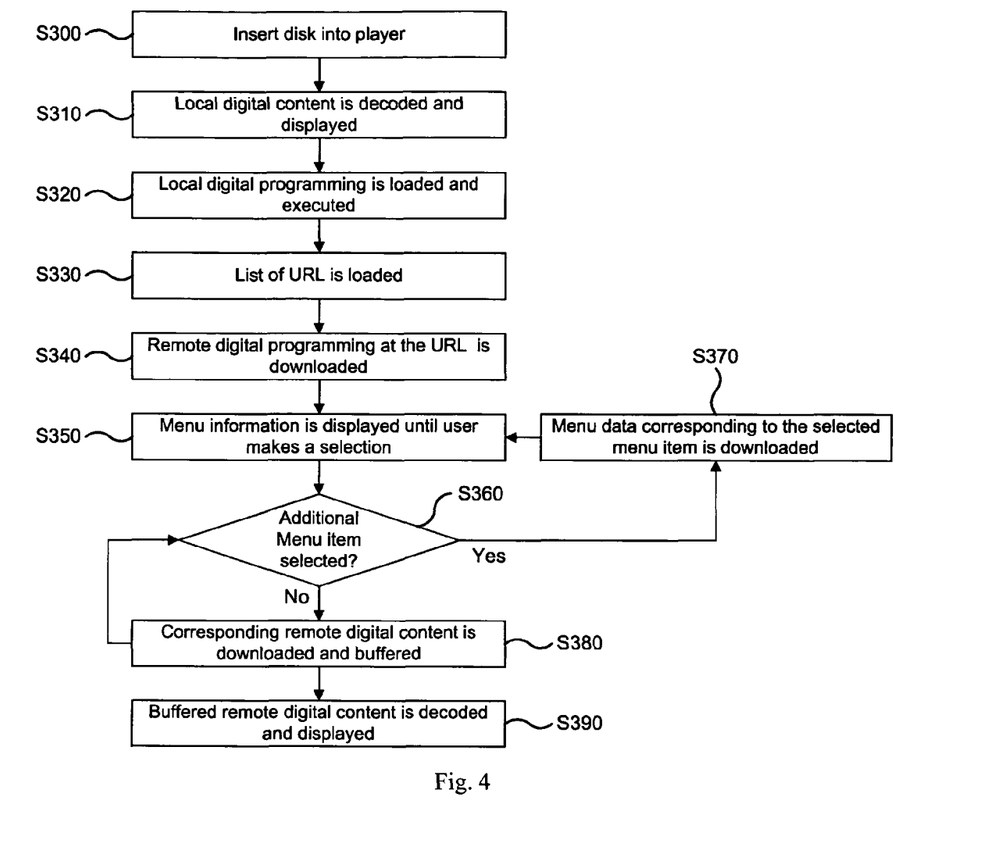
FIG. 4 is a flow diagram illustrating a method for reproducing a digital content using a network with a third embodiment of the present invention.

FIG. 4 is a flow diagram illustrating a method for reproducing a digital content using a network with a third embodiment of the present invention.

Similar to the method shown in FIGS. 2 and 3, FIG. 4 illustrates a method carried out in an apparatus for reproducing the digital content using the network such as the DVD player capable of establishing the network connection wherein the optical disk such as the DVD is used as the storage.

Referring to FIG. 4, when the optical disk is inserted in the DVD player (S300), a local digital content stored in the optical disk may be decoded and outputted to a display device to be provided to a user (S310). Simultaneously, a local digital programming stored in the optical disk is loaded in a memory and executed (S320).

A BD-J implementation may be employed to automatically look for the local digital programming such as a startup xlet each time the disk is inserted into the DVD player. The local digital programming includes a local menu data including a local menu information including background images and formatting instructions. The local digital programming also includes a list of an URLs of remote digital programmings. In accordance with the third embodiment, the remote digital programming comprises a basic remote menu data which may include images, buttons, text and a basic remote menu information for formatting the images, the buttons and the text on the screen.

The list of the URLs of the remote digital programmings is loaded into the memory (S330) when the local digital programming is executed.

Thereafter, the remote digital programming at a first URL in the list is downloaded via the network such as The Internet and displayed (S340).

The remote digital programming, i.e. the menu information is displayed until the user makes a selection with a remote control of the DVD player (S350).

If the selection made by the user is an additional menu item (S360), the corresponding remote digital programming, i.e. the corresponding menu data is downloaded (S370). If the selection made by the user is an additional remote digital programming (S360), the corresponding remote digital programming, i.e. the corresponding remote digital content is downloaded and buffered (S380).

When the remote digital content is buffered sufficiently, the buffered remote digital content is decoded and displayed on the screen (S390).

Figure 5:
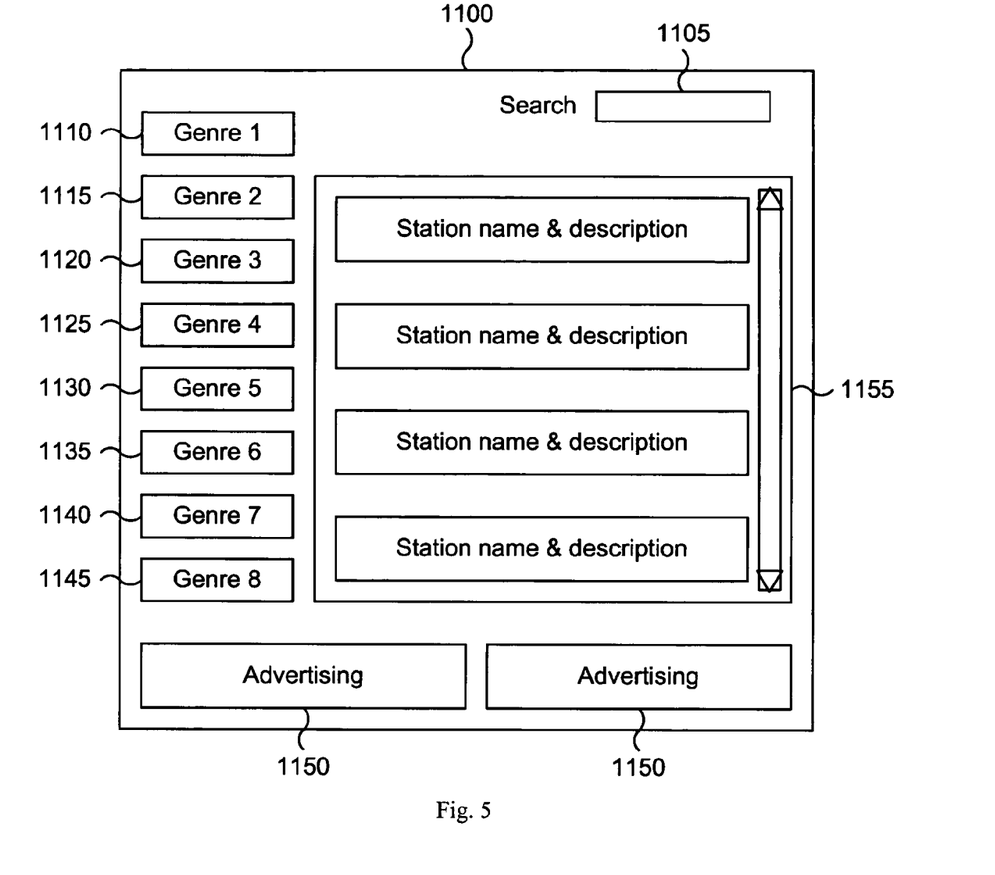
FIG. 5 is a diagram depicting a user interface 1100 displayed on the screen in accordance with the third embodiment of the present invention.

FIG. 5 is a diagram depicting a user interface 1100 displayed on the screen in accordance with the third embodiment of the present invention.

Referring to FIG. 5, a large catalog of streaming radio stations is displayed on the screen. The user may select one of different genres 1110 through 1145 using the remote control. When one of the genres is selected by means of the remote control, a scrollable window 1155 is displayed on the screen to show a list of selectable music sources. Selecting one of the genres corresponds to the step S360 in FIG. 4 while the scrollable window 1155 being displayed on the screen corresponds to the step S370 in FIG. 4.

When the user selects one of the sources, the audio stream corresponding to the selected source is downloaded. Selecting and downloading the audio stream correspond to the steps S360 and S380.

As shown in FIG. 5, a search option 1105 is provided as well as a space for advertising 1150.

Figure 6:
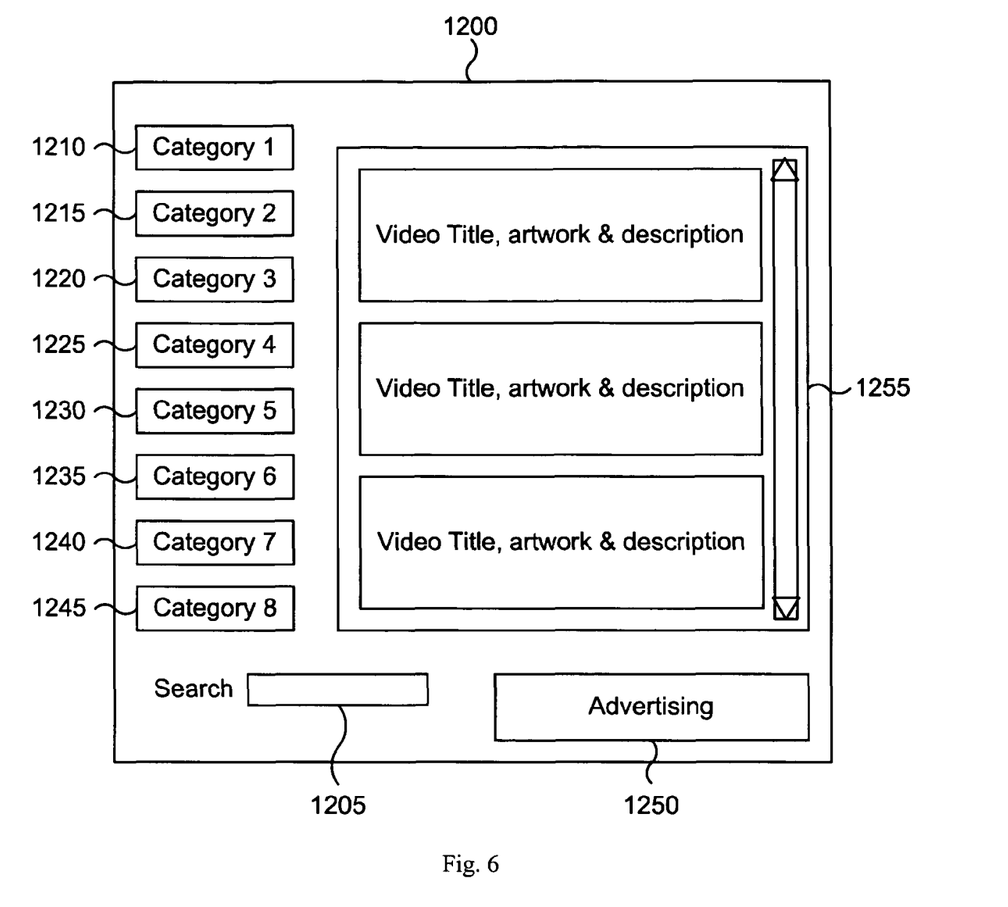
FIG. 6 is a diagram depicting a user interface 1200 displayed on the screen in accordance with the third embodiment of the present invention.

While FIG. 5 shows the large catalog of streaming radio stations, the same may be applied to video streams as shown in FIG. 6.

FIG. 6 is a diagram depicting a user interface 1200 displayed on the screen in accordance with the third embodiment of the present invention.

Referring to FIG. 6, a large catalog of video streams is displayed on the screen. The user may select one of different categories 1210 through 1245 using the remote control. When one of the categories is selected by means of the remote control, a scrollable window 1255 is displayed on the screen to show a list of selectable video sources. Selecting one of the categories corresponds to the step S360 in FIG. 4 while the scrollable window 1255 being displayed on the screen corresponds to the step S370 in FIG. 4.

When the user selects one of the video sources, the video stream corresponding to the selected source is downloaded. Selecting and downloading the video stream correspond to the steps S360 and S380.

As shown in FIG. 6, a search option 1205 is provided as well as a space for advertising 1250.

Figure 7:
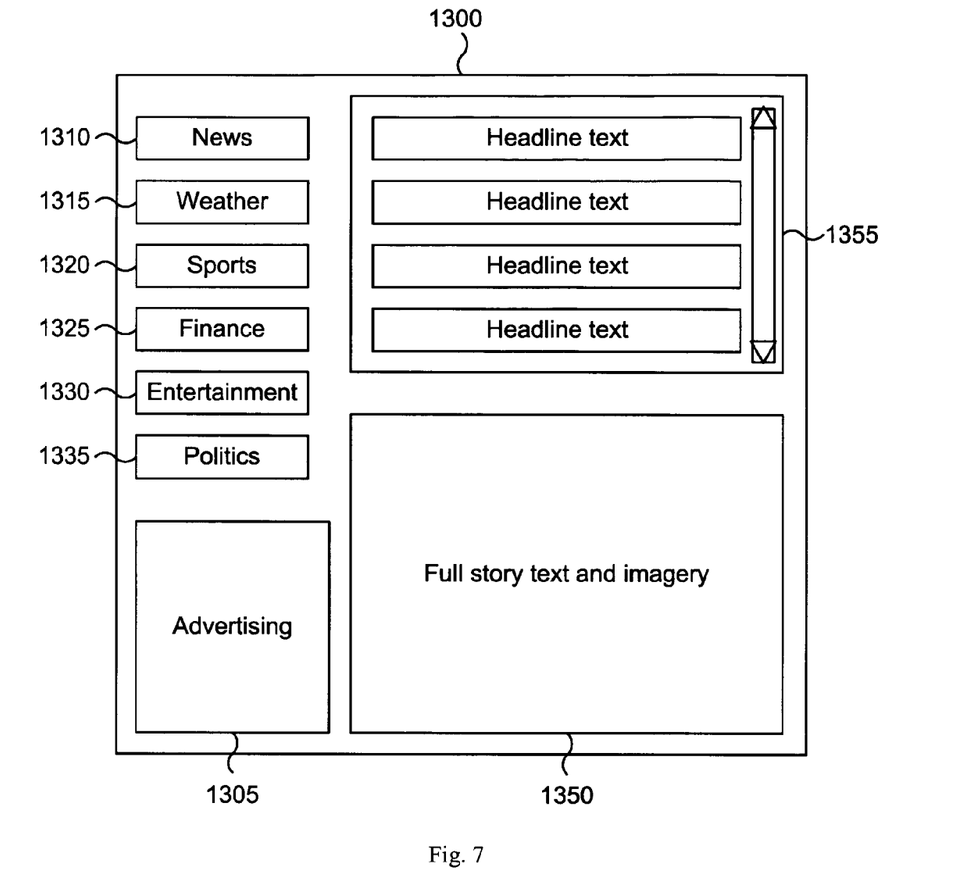
FIG. 7 is a flow diagram illustrating a method for reproducing a digital content using a network with a fourth embodiment of the present invention.

FIG. 7 is a flow diagram illustrating a method for reproducing a digital content using a network with a fourth embodiment of the present invention.

Similar to the method shown in FIGS. 2 through 4, FIG. 7 illustrates a method carried out in an apparatus for reproducing the digital content using the network such as the DVD player capable of establishing the network connection wherein the optical disk such as the DVD is used as the storage.

Referring to FIG. 7, when the optical disk is inserted in the DVD player (S400), a local digital content stored in the optical disk may be decoded and outputted to a display device to be provided to a user (S410). Simultaneously, a local digital programming stored in the optical disk is loaded in a memory and executed (S420).

A BD-J implementation may be employed to automatically look for the local digital programming such as a startup xlet each time the disk is inserted into the DVD player. The local digital programming includes a list of an URL of a remote periodic digital programming that may be accessed periodically. The URL may include a link for at least one of a video/audio stream, a UI objects, a program data and a workflow instruction required for an interactive application.

The list of the URL of the remote periodic digital programming is loaded into the memory (S430) when the local digital programming is executed.

Thereafter, the remote periodic digital programming at the URL is downloaded and pre-loaded into a frame buffer via the network such as The Internet (S440 and S450).

Thereafter, the downloaded remote periodic digital programming is provided to the user via the screen together with the local digital content (S460).

Once the downloaded remote periodic digital programming is provided, a countdown timer is started (S470). The downloaded remote digital programming is provided is until the countdown timer expires (S490).

When the countdown timer expires (S480), an updated version of the remote periodic digital programming at the URL is downloaded (S440).

Figure 8:
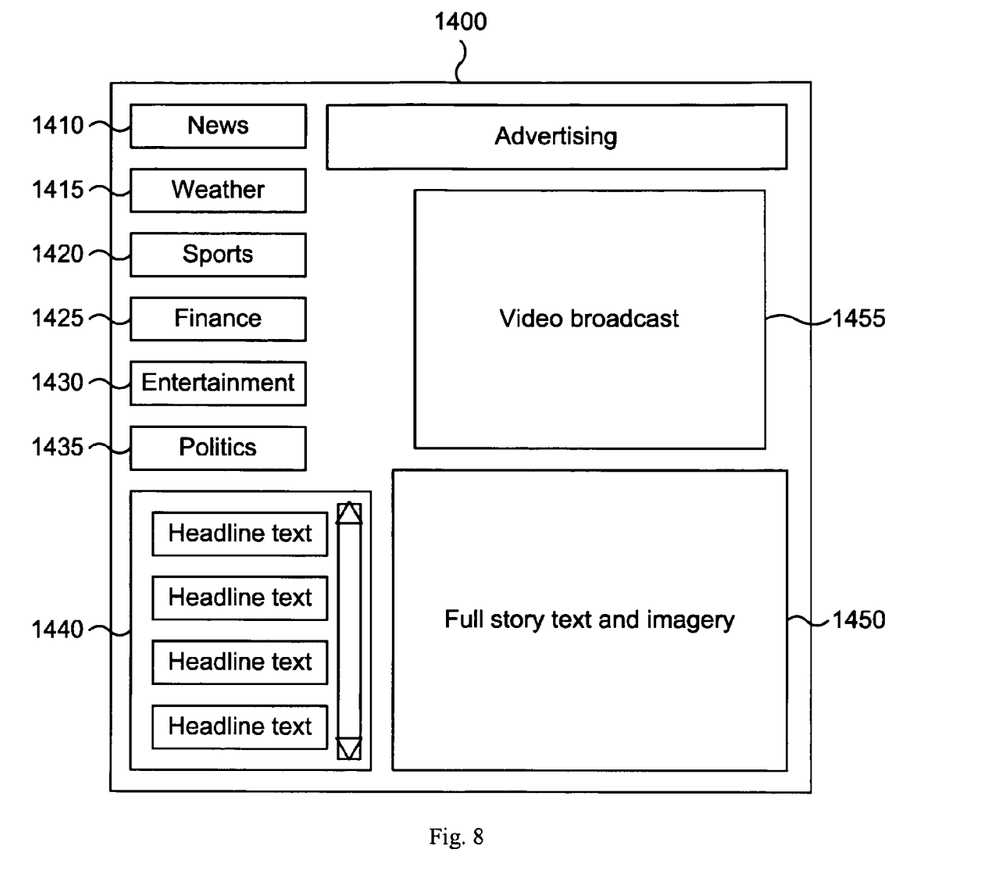
FIG. 8 is a diagram depicting a user interface 1200 displayed on the screen in accordance with the fourth embodiment of the present invention.

FIG. 8 is a diagram depicting a user interface 1300 displayed on the screen in accordance with the fourth embodiment of the present invention.

Referring to FIG. 8, a large catalog of textual information is displayed on the screen. The user may select one of subject categories 1310 through 1335 using the remote control. When one of the subject categories 1310 through 1335 is selected by means of the remote control, a scrollable window 1355 is displayed on the screen to show a list of associated headlines.

When the user selects one of the associated headlines, a full text and any associated imagery corresponding to the selected headline is downloaded and displayed through a windows 1350. The list of associated headlines is updated when the countdown timer expires in order to provide the latest news as in the steps S480 and S490.

As shown in FIG. 8, a space for advertising 1340 is provided.

Figure 9:
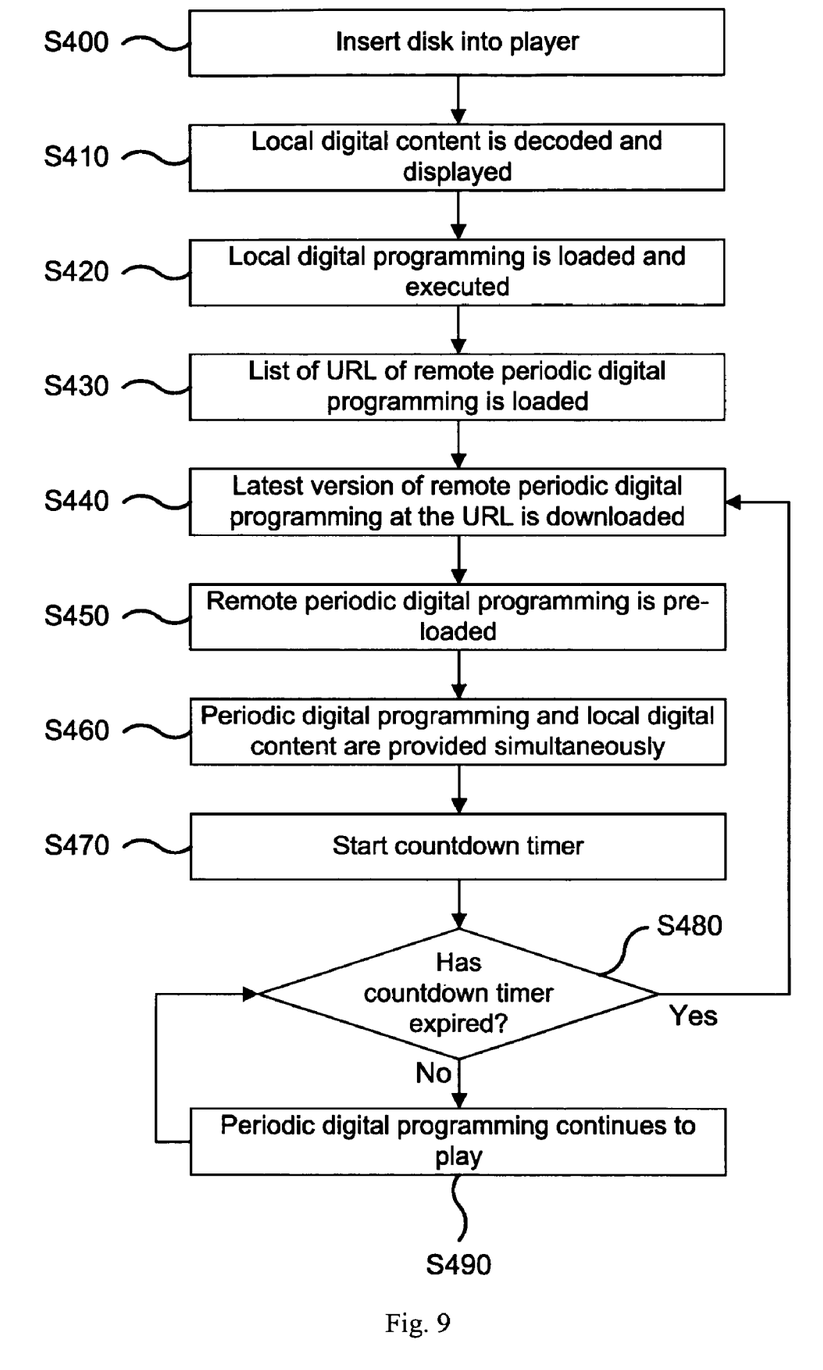
FIG. 9 is a diagram depicting a user interface 1200 displayed on the screen in accordance with the fourth embodiment of the present invention.

FIG. 9 is a diagram depicting a user interface 1400 displayed on the screen in accordance with the fourth embodiment of the present invention.

Referring to FIG. 9, a large catalog of textual information is displayed on the screen. The user may select one of subject categories 1410 through 1435 using the remote control. When one of the subject categories 1410 through 1435 is selected by means of the remote control, a scrollable window 1440 is displayed on the screen to show a list of associated headlines while playing video stream, which may be the local digital content or the remote digital content, through the window 1455.

When the user selects one of the associated headlines, a full text and any associated imagery corresponding to the selected headline is downloaded displayed through a windows 1450. The list of associated headlines is updated when the countdown timer expires in order to provide the latest news as in the steps S480 and S490.

As shown in FIG. 9, a space for advertising 1350 is provided.

Figure 10:
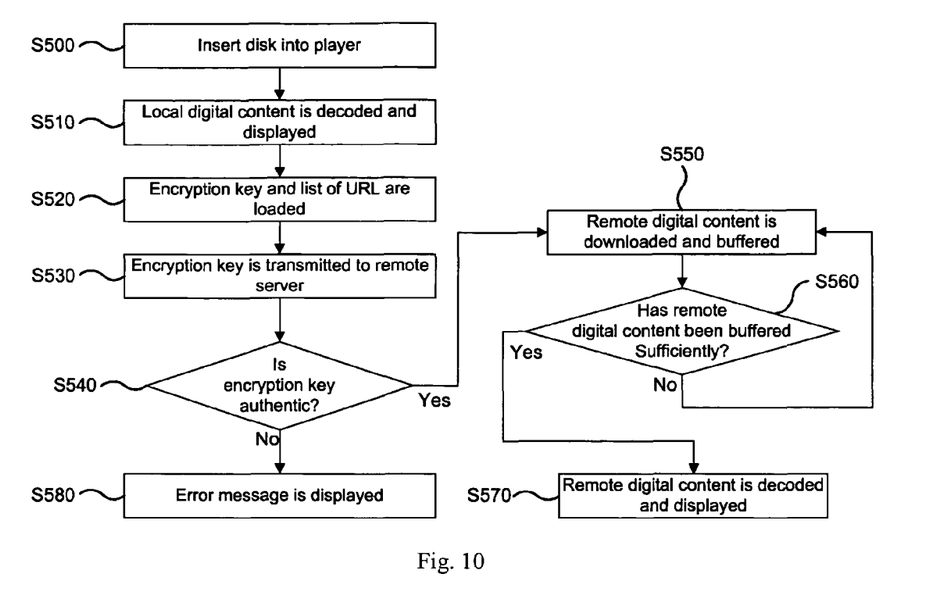
FIG. 10 is a flow diagram illustrating a method for reproducing a digital content using a network with a fifth embodiment of the present invention.

FIG. 10 is a flow diagram illustrating a method for reproducing a digital content using a network with a fifth embodiment of the present invention.

Similar to the method shown in FIGS. 2 through 4 and FIG. 7, FIG. 10 illustrates a method carried out in an apparatus for reproducing the digital content using the network such as the DVD player capable of establishing the network connection wherein the optical disk such as the DVD is used as the storage.

Referring to FIG. 10, when the optical disk is inserted in the DVD player (S500), a local digital content stored in the optical disk may be decoded and outputted to a display device to be provided to a user (S510). Simultaneously, a local digital programming stored in the optical disk is loaded in a memory (S520).

A BD-J implementation may be employed to automatically look for the local digital programming such as a startup xlet each time the disk is inserted into the DVD player. The local digital programming includes an encryption key and a list of an URL of a remote digital programming. The URL may include a link for at least one of a remote server for an authentication, a video/audio stream, a UI objects, a program data and a workflow instruction required for an interactive application. In accordance with the second embodiment, the remote digital programming may be a remote digital content such as the video/audio stream.

Thereafter, the encryption key is transmitted to the remote server at the corresponding URL via the network (S530). The remote server determines whether the encryption key is authentic, i.e. whether the optical disk is a legal copy (S540). If the encryption key is authentic, the key is accepted by the remote server and the remote digital programming is downloaded and buffered (S550). When the remote digital content is buffered sufficiently (S560), the buffered remote digital content is decoded and displayed on the screen (S570).

If the encryption key is not authentic, the remote server rejects the encryption key, and an error message is displayed on the screen (S580).

As described above, the apparatus and the method in accordance with the present invention is advantageous in that the downloading of the remote digital programming such as the digital content and the menu data via the network is supported to provide the user with contents that is not included in a storage medium at the time of manufacturing thereof.

In addition, the apparatus and the method in accordance with the present invention is advantageous in that the updated version of information which requires a latest data such as a whether information and a traffic information may be downloaded and provided to the user.

Moreover, the apparatus and the method in accordance with the present invention is advantageous in that the menu data is intentionally architected in discrete pieces such as the basic menu data and the additional menu data such that a user interface may be changed without requiring the entire menu data to be recompiled, reloaded, or downloaded again. Such configuration also allows the menu data pre-recorded on the storage medium at the time of manufacturing to include placeholders for external information such as the audio streams, the video streams, still images and any other data that may be retrieved via the network, thereby improving the flexibility of the content provided by the pre-recorded storage medium.

In addition, the apparatus and the method in accordance with the present invention is advantageous in that two or more video/audio streams may be displayed simultaneously on the screen to provide a plurality of information to the user simultaneously.

In addition, the apparatus and the method in accordance with the present invention is advantageous in that an authentication process may be carried out using the encryption key to verify a rightful user over the network.

While the present invention has been particularly shown and described with reference to the preferred embodiment thereof, it will be understood by those skilled in the art that various changes in form and details may be effected therein without departing from the spirit and scope of the invention.

What is claimed is:

1. A digital content reproducing apparatus comprising:
a storage medium which stores a local digital programming and a local digital content therein, the local digital programming including a list comprising pairs of corresponding timecodes and URLs of remote digital programmings, each of the plurality of URLs corresponding to one of the plurality of timecodes;
a network interface which downloads the remote digital programmings according to the list stored in the storage;
a decoder which decodes and outputs the local digital content stored in the storage to provide the local digital content to a user; and
a controller which, for each of the pairs on the list stored on the storage medium, controls the network interface to download the remote digital programmings from the URL in the pair, and executes the downloaded remote digital programming to be provided to the user when the corresponding timecode in the pair is reached, wherein the executed remote digital programming downloaded by the network interface and the local digital content decoded by the decoder are provided to the user simultaneously according to the timecode of the pair.

2. The apparatus in accordance with claim 1, wherein each of the plurality of URLs contains a link to a corresponding one of the remote digital programmings, and each of the remote digital programmings comprises at least one of an UI object, a program data, a workflow instruction, or combinations thereof.

3. The apparatus in accordance with claim 1, wherein each of the remote digital programmings is combined with the local digital content.

4. The apparatus in accordance with claim 1, wherein one of the remote digital programmings is provided to the user in a manner that the one of remote digital programmings occupies a portion of the local digital content.

5. The apparatus in accordance with claim 1, wherein each of the remote digital programmings comprises a basic remote menu data including a basic remote menu information to be displayed.

6. The apparatus in accordance with claim 5, wherein the controller controls the network interface to download at least one of an additional remote menu data and a remote digital content according to a selection of the user from the displayed basic remote menu information.

7. The apparatus in accordance with claim 6, wherein the controller controls the decoder to decode and output the remote digital content downloaded by the network interface to be provided to the user.

8. The apparatus in accordance with claim 1, wherein the controller controls the network interface to periodically download the at least one of remote digital programmings in order to provide an updated version of the at least one of remote digital programmings to the user.

9. The apparatus in accordance with claim 1, wherein the storage medium further stores an encryption key, and the controller controls the network interface to transmit the encryption key to a server providing the remote digital programmings for an authentication prior to downloading the remote digital programmings.

10. The apparatus in accordance with claim 1, wherein the storage medium is an optical disk or a non-volatile memory.

11. A method for reproducing a digital content, the method comprising steps of:
executing a local digital programming including a list comprising pairs of corresponding timecodes and URLs of remote digital programmings, each of the plurality of URLs corresponding to one of the plurality of timecodes;
for each of the pairs, downloading the corresponding the remote digital programming from the URL of the pair;
decoding and outputting a local digital content to provide the local digital content to a user; and
executing the downloaded one of the remote digital programmings to be provided to the user when the corresponding timecode is reached, wherein the executed remote digital programming and the decoded and output local digital content are provided to the user simultaneously.

12. The method in accordance with claim 11, wherein each of the plurality of URLs contains a link to a corresponding one of the remote digital programmings, and each of the remote digital programmings comprises at least one of an UI object, a program data, a workflow instruction, or combinations thereof.

13. The method in accordance with claim 11, wherein the executing the downloaded remote digital programming comprises combining the executed remote digital programming with the decoded and output local digital content.

14. The method in accordance with claim 11, wherein the executing the downloaded remote digital programming comprises executing the executed remote digital programming in a manner that the executed remote digital programming occupies a portion of a display on which the decoded and output local digital content is displayed.

15. The method in accordance with claim 11, wherein each of the remote digital programmings comprises a basic remote menu data including a basic remote menu information to be displayed.

16. The method in accordance with claim 15, further comprising downloading at least one of an additional remote menu data and a remote digital content according to a selection of the user from the displayed basic remote menu information.

17. The method in accordance with claim 16, further comprising decoding and outputting the remote digital content to be provided to the user.

18. The method in accordance with claim 11, wherein the downloading the corresponding the remote digital programming is carried out periodically in order to provide an updated version of the corresponding the remote digital programming to the user.

19. The method in accordance with claim 11, further comprising transmitting an encryption key to a server providing the remote digital programmings for an authentication prior to downloading the corresponding the remote digital programming.

* * * * *